United States Patent
Rousseau et al.

(10) Patent No.: US 10,323,591 B2
(45) Date of Patent: Jun. 18, 2019

(54) METHOD FOR ACCELERATING THE WARMING-UP OF A MOTOR VEHICLE POWER UNIT IN ORDER TO PLACE IT UNDER OPERATING CONDITIONS FOR TESTING AND/OR FOR A MAINTENANCE OPERATION

(71) Applicants: Continental Automotive France, Toulouse (FR); Continental Automotive GmbH, Hannover (DE)

(72) Inventors: Cyril Rousseau, La Salvetat Saint Gilles (FR); Jonas Percheron, Gimont (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/778,433

(22) PCT Filed: Nov. 18, 2016

(86) PCT No.: PCT/EP2016/001933
§ 371 (c)(1),
(2) Date: May 23, 2018

(87) PCT Pub. No.: WO2017/088970
PCT Pub. Date: Jun. 1, 2017

(65) Prior Publication Data
US 2018/0347491 A1  Dec. 6, 2018

(30) Foreign Application Priority Data
Nov. 24, 2015 (FR) ..................... 15 61278

(51) Int. Cl.
*F02D 41/06* (2006.01)
*G01M 15/04* (2006.01)
(Continued)

(52) U.S. Cl.
CPC ......... *F02D 41/068* (2013.01); *F02D 41/064* (2013.01); *F02D 41/086* (2013.01);
(Continued)

(58) Field of Classification Search
CPC ........... F02D 2001/0075; F02D 31/008; F02D 41/0255; F02D 41/064; F02D 41/068;
(Continued)

(56) References Cited

U.S. PATENT DOCUMENTS 3,105,391 A * 10/1963 Thompson ............. B60K 26/02
74/470
3,938,377 A * 2/1976 Converse ................ F01N 11/00
73/114.71
(Continued)

FOREIGN PATENT DOCUMENTS

DE        4302482 A1    8/1994
DE       19826866 A1   12/1999
(Continued)

OTHER PUBLICATIONS

International Search Report and Written Opinion for International Application No. PCT/EP2016/001933, dated Feb. 20, 2017, 8 pages.
(Continued)

*Primary Examiner* — Stephen K Cronin
*Assistant Examiner* — Anthony L Bacon
(74) *Attorney, Agent, or Firm* — RatnerPrestia (57) ABSTRACT

A method for accelerating the warming-up of a power unit of a vehicle including an internal combustion engine, the unit needing to undergo a test and/or maintenance operation during which the vehicle remains stationary with its engine running, the unit needing to have achieved a minimum operating temperature prior to the test and/or the operation, the unit including a fuel injection system with a high-
(Continued)

pressure pump supplying pressurized fuel to one or more injectors, the pressurizing of the fuel by the pump being controlled according to a combustion configuration that requires a nominal pressure value dependent on operating parameters including an engine speed and engine torque, the method including a step of warming up the unit by maintaining a greatly accelerated idling speed, which is effected at a modified pressure value higher than the nominal pressure value.

13 Claims, 3 Drawing Sheets

(51) Int. Cl.
    *F02D 41/08*     (2006.01)
    *F02D 41/38*     (2006.01)
    *F02M 53/02*     (2006.01)
    *F02N 19/04*     (2010.01)
    *F02M 59/44*     (2006.01)

(52) U.S. Cl.
    CPC ......... *F02D 41/3836* (2013.01); *F02M 53/02* (2013.01); *F02N 19/04* (2013.01); *F02D 2200/0602* (2013.01); *F02D 2200/0606* (2013.01); *F02M 59/447* (2013.01); *G01M 15/04* (2013.01)

(58) Field of Classification Search
    CPC ............... F02D 41/086; F02D 41/3836; F02D 2200/0602; F02D 2200/0606; F02M 53/02; F02M 59/447; G01M 15/04
    See application file for complete search history.

(56) References Cited

U.S. PATENT DOCUMENTS

| | | | |
|---|---|---|---|
| 4,372,278 A * | 2/1983 | Smith | F02D 35/00 |
| | | | 123/478 |
| 2003/0089319 A1* | 5/2003 | Duvinage | B60H 1/02 |
| | | | 123/41.02 |
| 2008/0133116 A1 | 6/2008 | Mischler et al. | |
| 2013/0332051 A1 | 12/2013 | Wolk et al. | |
| 2015/0000630 A1 | 1/2015 | Coldren | |
| 2015/0322879 A1* | 11/2015 | Zeng | F02D 41/3094 |
| | | | 701/103 |

FOREIGN PATENT DOCUMENTS

| | | |
|---|---|---|
| DE | 10058057 A1 | 6/2002 |
| EP | 1209350 A2 | 5/2002 |
| JP | 2002097985 A | 4/2002 |
| JP | 2002195060 A | 7/2002 |
| JP | 2003214235 A | 7/2003 |
| WO | 2004038360 A1 | 5/2004 |

OTHER PUBLICATIONS

English Translation of the Written Opinion for International Application No. PCT/EP2016/001933, dated Feb. 20, 2017, 5 pages.

\* cited by examiner

METHOD FOR ACCELERATING THE WARMING-UP OF A MOTOR VEHICLE POWER UNIT IN ORDER TO PLACE IT UNDER OPERATING CONDITIONS FOR TESTING AND/OR FOR A MAINTENANCE OPERATION

CROSS REFERENCE TO RELATED APPLICATIONS

This application is the U.S. National Phase Application of PCT International Application No. PCT/EP2016/001933, filed Nov. 18, 2016, which claims priority to French Patent Application No. 1561278, filed Nov. 24, 2015, the contents of such applications being incorporated by reference herein.

FIELD OF THE INVENTION

The present invention relates to a method for accelerating the warming-up of a motor vehicle power unit having an internal combustion engine, in order to place it under operating conditions for testing and/or for a maintenance operation performed with the vehicle stationary and the engine running.

BACKGROUND OF THE INVENTION

Certain tests and/or maintenance operations require, in order to carry them out, the power unit to have reached a minimum temperature. For example, tests on a system that injects fuel into the internal combustion engine require the engine, the injection system and the fuel to have reached a respective minimum temperature.

For other tests and/or maintenance operations, these conditions may extend to other auxiliary elements that the power unit comprises, for example a cooling circuit and/or a lubricating circuit of the internal combustion engine, an exhaust line for the exhaust gases leaving the engine, and notably one or more emissions-control elements located in this line, etc.

Prior to these tests and/or maintenance operations, the power unit is therefore warmed up so that at least some elements of this unit reach the temperature required for starting the tests and/or operations.

Figure 1:
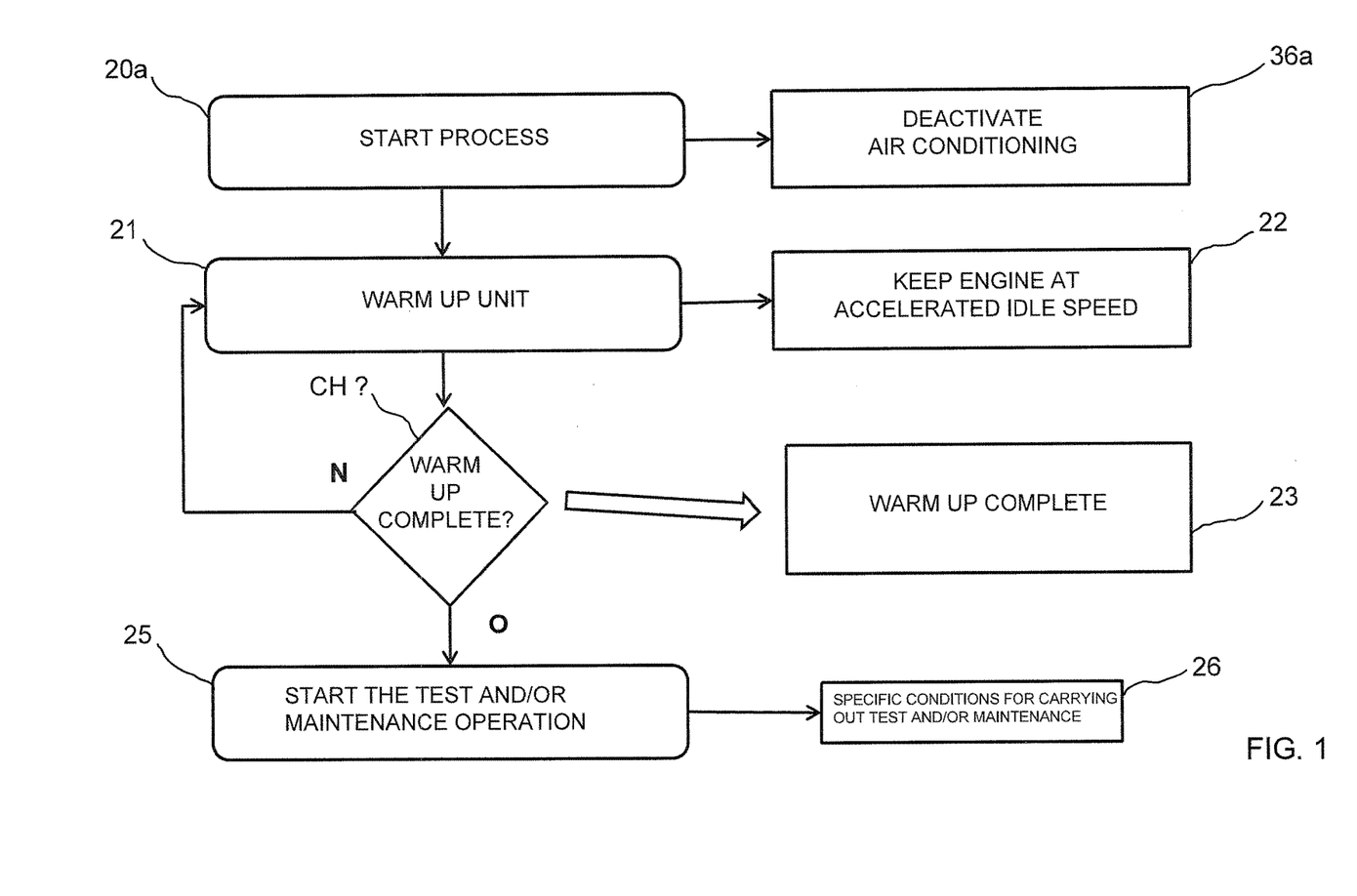
FIG. 1 is a flow diagram showing the steps of a method for accelerating the warming-up of a power unit according to the prior art, FIG. 2 schematically depicts a schematic view of a fuel injection system for a power unit comprising an internal combustion engine of a motor vehicle, it being possible for this injection system to implement the method for accelerated warming-up of the engine according to an aspect of the present invention.

According to the prior art with reference to FIG. 1, and considering the nonlimiting example of a test on the injectors of the fuel injection system of the internal combustion engine, the method for accelerating the warming-up according to the prior art, referenced 20a in FIG. 1, foresees a step 21 of warming up the unit by keeping the engine at a greatly accelerated idling speed 22.

As soon as this method 20a is begun, the air conditioning is deactivated 36a. This nevertheless presents the disadvantage of not assisting with the accelerated warming-up of the power unit because the engine has not been subjected to any additional torque demand caused by the operation of the air conditioning.

At periodic intervals during the progress of the accelerated warming-up according to the prior art, the question as to whether the warming-up has reached the level required for preceding with the test and/or with a maintenance operation is asked, and this is symbolized by CH ? in FIG. 1. If the answer is yes, symbolized by 0, then the test and/or the maintenance operation is proceeded with, and if the answer is no, symbolized by N, the accelerated warming-up method is continued, repeating step 21.

The reference 23 symbolizes the final conditions representative of completed accelerated warming-up. In the case of a test relating to an injection system, the accelerated warming-up may be considered to have been completed when the coolant temperature in the engine cooling circuit and the fuel temperature are higher than a respective value that can be calibrated.

The method then proceeds to start the test and/or the maintenance operation referenced 25. The specific conditions for carrying out the test and/or the maintenance operation 25, for example, but not necessarily, a specific fuel pressure, are referenced in 26.

The combustion settings employed during this accelerated warming-up according to the prior art are the standard or nominal settings which are selected to reduce pollutant emissions in the exhaust gases and fuel consumption and which are therefore unfavorable with regards to increasing the temperature of the power unit.

Such an accelerated warming-up according to the prior art prior to commencing the test and/or the maintenance operation therefore often lasts too long, more particularly when the external temperature is low.

That requires the vehicle to be immobilized for a lengthy period of time at the site at which the vehicle is kept stationary and therefore occupies the test and/or maintenance operation facilities for all the time for which the vehicle power unit has not reached the required temperatures specific to the test and/or to the maintenance operation. It then follows that the test and/or the maintenance operation cannot always take place or may sometimes have to be interrupted through lack of time.

In addition, because the prior accelerated warming-up takes a long time according to the prior art, maintaining a greatly accelerated idling speed, for example of the order of 2500 revolutions per minute, for a long period of time, is uncomfortable for personnel located in the external environment of the vehicle to withstand, given the noise caused by this accelerated idling speed.

As an idea of the figures involved, starting from an outside temperature of −10° C., such accelerated warming-up according to the prior art makes it possible to reach a coolant temperature desired for the test and/or operation in 30 minutes or to arrive at a desired fuel temperature in 50 minutes, this or these temperatures being required for commencing most tests and/or maintenance operations. These lengths of time are too long and need to be shortened.

Document DE-A-10058057, incorporated by reference herein, describes a method for rapidly warming up a combustion engine during a phase of starting a rolling vehicle. That document therefore does not describe accelerated warming-up of a power unit of a stationary vehicle prior to a test and/or maintenance operation, although its teaching can be adapted to such warming-up.

The objective of the warming-up sought in that document is to activate the phase of starting of an internal combustion engine. To accelerate the warming-up, provision is made for the delivery of fuel compressed by the injection system to be increased. Furthermore, provision is made for this increased fuel delivery not to be injected into the internal combustion engine but to be used as a heat source for warming up the engine cooling circuit, this being done by way of a heat exchanger exchanging heat between the fuel and the coolant positioned in a return circuit returning the fuel to a fuel tank.

Such a method presents the disadvantage of increased fuel consumption and non-uniform warming-up of the engine since the injectors for example are heated little if at all by the additional quantity of fuel which is not injected into the engine.

SUMMARY OF THE INVENTION

The problem underlying an aspect of the present invention is, in the case of a method for the accelerated warming-up of a power unit of a motor vehicle, the vehicle needing to undergo a test and/or maintenance operation that requires a vehicle stationary with the engine running, one or more of the elements of the power unit needing to have achieved minimum temperatures required for carrying out the test and/or the operation, the warming-up being achieved partially by recuperating heat from a fuel supplied to an injection system of the engine, to optimize this recuperation of heat for the power unit.

To this end, an aspect of the invention provides a method for accelerating the warming-up of a power unit of a motor vehicle comprising an internal combustion engine, the power unit needing to undergo a test and/or maintenance operation during which the vehicle remains stationary with its engine running, the power unit needing to have achieved a minimum operating temperature prior to the test and/or the maintenance operation, the power unit comprising a fuel injection system injecting fuel into the engine using a high-pressure pump supplying pressurized fuel to one or more injectors that inject fuel into the engine, the pressurizing of the fuel by the pump being controlled according to a combustion configuration that requires a nominal pressure value dependent on engine operating parameters including an engine speed and torque, the method comprising a step of warming up the unit by keeping the engine at a greatly accelerated idling speed, characterized in that the greatly accelerated idling speed is maintained at a modified fuel-pressure value higher than the nominal pressure value required so as to increase the temperature of the fuel, the operation of the injectors, in the injection phase, being reduced so that there is no increase in the fuel consumption of the vehicle as a result of said operation at the greatly accelerated idling speed taking place at said modified fuel-pressure value other than that caused by the increase in the resistive torque of the high-pressure pump, corresponding to the increase in the fuel-pressure value which is modified in comparison with the nominal pressure required.

The technical effect obtained as a result of the increase in the volume of fuel compressed in the pump and then supplied to the injectors at a fuel pressure increased above the necessary nominal pressure required for engine operation under normal conditions is that additional heat is conferred upon the fuel as a result of the compression which is easier to manage because it is directly available for accelerating the raising of the temperature of the engine.

The increase in pressure in the pump creates an increase in fuel temperature and an increase in resistive torque. The fuel thus compressed warms up the injectors, whereas in the nearest prior art the fuel was not delivered into the engine by the injectors but was used in the return-to-tank circuit to exchange heat with the engine coolant and therefore indirectly to exchange heat with the engine via the coolant. The increase in resistive torque makes it possible to increase the quantity of fuel to be burnt in order to maintain the engine speed, thus creating more combustion heat and thus making it possible to accelerate the warming-up of the cooling circuit.

According to an aspect of the invention, there is no increase in vehicle fuel consumption in order to achieve this prior heating other than that caused by the increase in the resistive torque. The quantity of fuel consumed remains approximately the same, but to compensate for the increase in pressure, the operation of the injectors during the injection phase will indeed be reduced automatically.

Optionally, an aspect of the invention also comprises at least any one of the following features:

the modified pressure value is comprised between 1.25 and two times the nominal pressure required, the greatly accelerated idling speed being in the region of an engine speed of 2000 to 3000 revolutions per minute. This idling speed is a compromise between the most greatly accelerated possible idling speed and an idling speed that generates a tolerable volume of noise;

at the same time as the greatly accelerated idling speed is maintained at the modified pressure value higher than the nominal pressure value required, combustion settings for increasing the heat of the engine, activation of an engine heater, increase in resistive torque by activation of the vehicle cabin air conditioning and/or of electric deicing means, and regeneration of at least one emissions-control element located in an exhaust line of the engine are implemented, individually or in combination;

the combustion settings for increasing the heat of the engine are made from a nominal operation of combustion that limits the production of carbon dioxide toward combustion settings that increase the operating temperature in the power unit, the combustion settings for increasing heat relating to the following settings considered individually or in combination: depending on the conditions, upward or downward adjustment of an admission of fresh air in order to increase pumping losses in the engine, upward adjustment of a fuel injection angle, upward adjustment of a quantity of fuel injected, adjustment of the timing of injection that takes place when each engine piston, mounted with the ability to slide in a cylinder, returns from its most inward position referred to as Top Dead Center in the cylinder after combustion in the engine. It is possible, for example, to increase the number of injections per combustion cycle, to downgrade the combustion efficiency by reducing the main injection and increasing the number of injections after Top Dead Center, this resulting in a reduction in torque but an increase in the delivery injected in order to compensate for the resistive torque of the engine;

when the power unit comprises an exhaust gas recirculation system recirculating gas at a regulated flow rate to an engine air intake, a combustion setting concerns altering the flow rate of the gases recirculated to the engine air intake. It is possible to arrive at a compromise in order to benefit from the hot air caused by the recirculation without taking it to excess, which would penalize combustion as a result of a lack of oxygen;

regeneration of said at least one emissions-control element is commenced when a future estimate of the pollutant charge in said at least one emissions-control element indicates that the maximum charge level of said at least one emissions-control element will be exceeded during the forthcoming test and/or operation or, on the other hand, on the condition that said at least one emissions-control element contains within it a minimal charge of pollutant requiring regeneration, that a minimum predetermined temperature in the exhaust line in the vicinity of said at least one emissions-control element is reached and that the programmed regeneration duration does not exceed the remaining time it will take to warm up the power unit before the test and/or operation.

Within the context of an aspect of the invention, there is provided a method for testing and/or performing a maintenance operation on a power unit during which the vehicle remains stationary with its engine running, the power unit needing to have achieved a minimum operating temperature prior to the test and/or to the operation, characterized in that accelerated warming-up prior to carrying out the test and/or the operation is performed in accordance with a method for the accelerated warming-up of a power unit described hereinabove.

Advantageously, the test is of the type whereby an individual correction is applied to an injector or a minimum mass of fuel to be injected is adapted.

An aspect of the invention also relates to a motor vehicle power unit comprising an internal combustion engine and its auxiliaries, the engine and the auxiliaries of the power unit being controlled by an engine command and control unit, the power unit comprising a fuel injection system with a high-pressure pump and a common rail supplying fuel to one or more injectors, characterized in that the engine command and control unit comprises means of controlling a greatly accelerated idling speed of the engine and means for controlling the pressure of the pump to a modified pressure value higher than the nominal pressure value, so as to implement the aforementioned accelerated warming-up method.

Another aspect of the invention relates to an assembly comprising equipment for carrying out tests and/or maintenance operations and such a power unit, the test and/or operation equipment being temporarily connected to the command and control unit of the power unit for the duration of the test and/or operation, in which the equipment comprises means for emitting a test and/or operation request to the engine command and control unit of the power unit, the command and control unit comprising means of receiving the request and means of activating the means for controlling the idling speed of the engine and the pressure of the pump as soon as the request emitted by the equipment is received.

BRIEF DESCRIPTION OF THE DRAWINGS

Other features, objects and advantages of the present invention will become apparent upon reading the detailed description that will follow and upon examining the appended drawings, given by way of nonlimiting examples, and in which.

DETAILED DESCRIPTION OF THE PREFERRED EMBODIMENTS

In what follows, power unit is understood to refer to the internal combustion engine but also to all the auxiliaries associated with the engine, such as, for example, an intake line admitting air into the engine, an exhaust line discharging gases leaving the engine, an engine coolant circuit, an engine lubricating oil circuit, an injection system injecting fuel into the engine, an exhaust gas recirculation system recirculating to the air intake, etc.

The power unit also comprises a command and control unit controlling all these elements for optimal operation of the unit.

Figure 2:
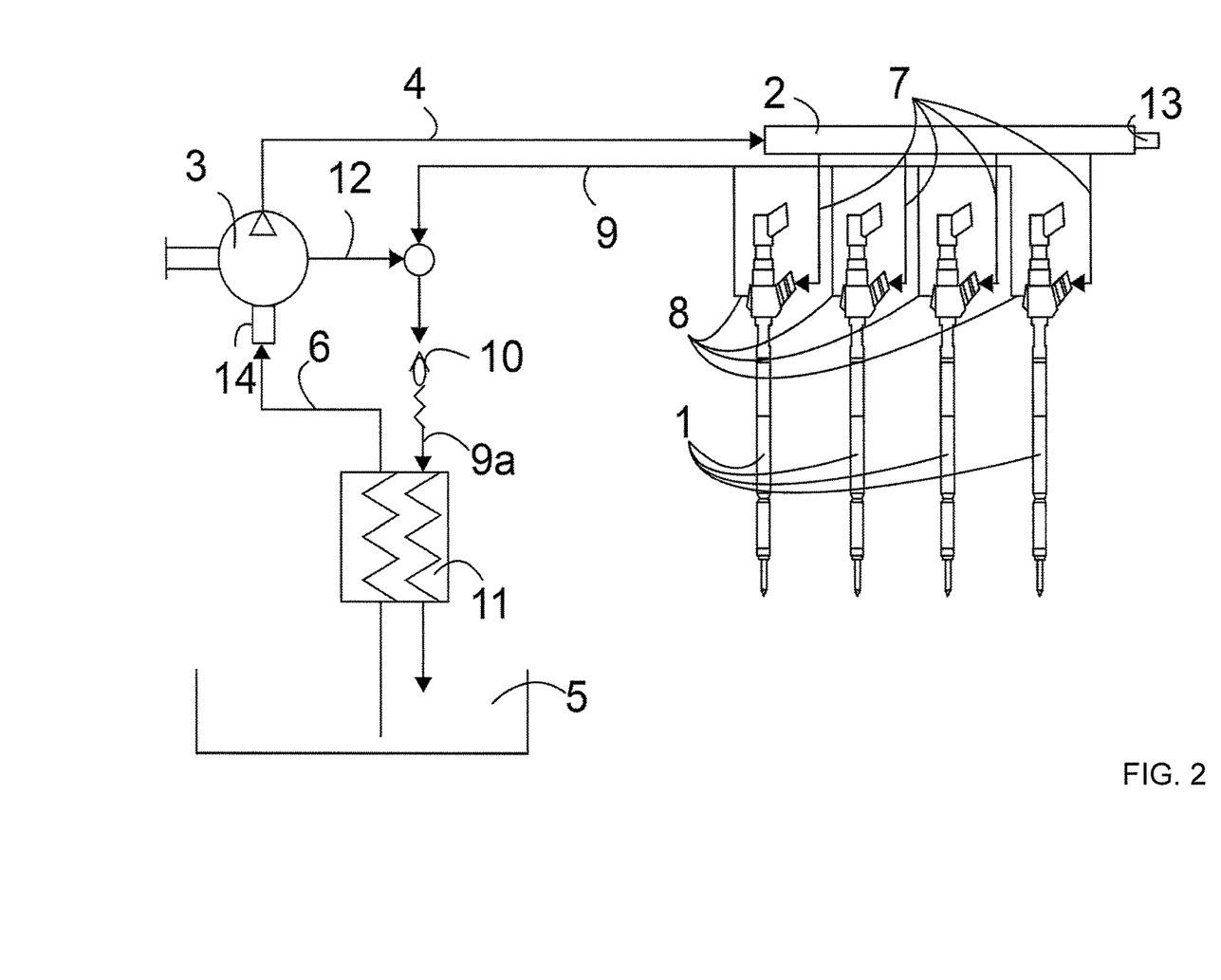

With reference to FIG. 2, an aspect of the present invention relates to a nonlimiting embodiment of a fuel injection system injecting fuel into an internal combustion engine known per se but which is able to implement the method according to the present invention for the accelerated warming-up of a power unit comprising said engine.

In this figure, the injection system comprises a series of injectors 1 for injecting fuel into one or more combustion chambers of the internal combustion engine, not depicted. The injectors 1, of which there are four in FIG. 2, which is nonlimiting, are each connected to a common rail 2.

The common rail 2 is supplied with fuel by a high-pressure pipe 4 from a high-pressure pump 3. This high-pressure pump 3 is supplied with fuel by a low-pressure supply pipe 6 connected to a fuel tank 5. Inside the tank 5, the fuel is at a pressure close to atmospheric pressure. The high-pressure pump 3 at its fuel inlet comprises a volume control valve 14.

The high pressure created by the pump 3, as controlled by a command and control unit of the internal combustion engine, may for example vary from 200 to 1900 bar according to internal combustion engine operating parameters that will be detailed later on. The low-pressure supply pipe 6 may contain a fuel filter, not shown in FIG. 2.

Each injector 1 is connected to the common rail 2 by a respective supply pipe 7 in which the fuel is substantially at the pressure of the common rail 2, and therefore without any significant decrease in pressure.

Each injector 1 also comprises a backleak pipe 8 connected to a return circuit 9 returning the fuel to the tank 5. Because of the very high fuel pressure in the supply pipe 7, there is always a residual loss of fuel at each injector 1, this loss being collected by the backleak pipe 8. This loss increases with running of the injector 1 and a loss of fuel due to operation of the injector 1, chiefly to its opening and closing, is added to this residual loss.

The backleak return circuit 9 comprises a regulating valve 10 regulating the pressure of the backleak returned to the tank. This backleak return circuit 9 is a low-pressure circuit, with a pressure preferably comprised between 1.6 and 2 bar. The backleak return circuit 9 is extended downstream of the backleak pressure regulating valve 10 by a low-pressure circuit portion 9a with an even lower pressure in this circuit portion 9a than in the backleak return circuit 9, being close to atmospheric pressure.

This low-pressure circuit portion 9a opens into the tank 5. The low-pressure circuit portion 9a may contain a heat exchanger 11 for an exchange of heat between relatively cold fuel leaving the tank 5 via the low-pressure supply pipe 6 and relatively hot fuel returned to the tank 5 by the low-pressure circuit portion 9a.

Because fuel losses may occur in the high-pressure pump 3 as the fuel is pressurized, a fuel loss pipe 12 connecting the high-pressure pump 3 to the fuel backleak return circuit 9 is provided, upstream of the pressure regulating valve 10, so as to collect these losses and return them to the tank 5.

A command and control unit of the power unit, not depicted in FIG. 2, controls various actuators present in the engine or various operating setpoints for engine parameters such as fuel injection, air flow rate in the engine intake, the delivery of pumps with which an engine cooling circuit or engine lubricating circuit are respectively equipped, etc. This control is performed in response to measurements from sensors present in the engine or in response to estimates of parameters from maps.

Thus, the command and control unit of the power unit controls the value of the output pressure of the high-pressure pump 3 according at least to the internal combustion engine speed and to the torque developed by the engine, the engine speed being measured and the developed torque being monitored using a torque setpoint. The pressure in the injectors 1 is therefore dependent on the engine speed and increases with this speed particularly when the torque is also increased. The pressure in the common rail 2 can be monitored by a pressure sensor 13.

The command and control unit may also operate actuators connected to the injectors by modifying for example their duration of opening, the quantity of fuel supplied to each injector and the direction of the jets of fuel or timing of the injection toward a mobile piston in a cylinder of a combustion chamber. For example, this duration of opening may be reduced automatically when the pressure increases.

There may be a heat engine combustion nominal operation map favoring, on the one hand, limiting the emission of pollutants contained in the exhaust gases leaving the engine, notably the production of carbon dioxide and nitrogen oxides and, on the other hand, protecting the internal combustion engine, notably by reducing as far as possible the dilution of the fuel in the engine lubricating oil and economizing fuel. This combustion setting is referred to as the nominal combustion or default combustion setting.

Figure 3:
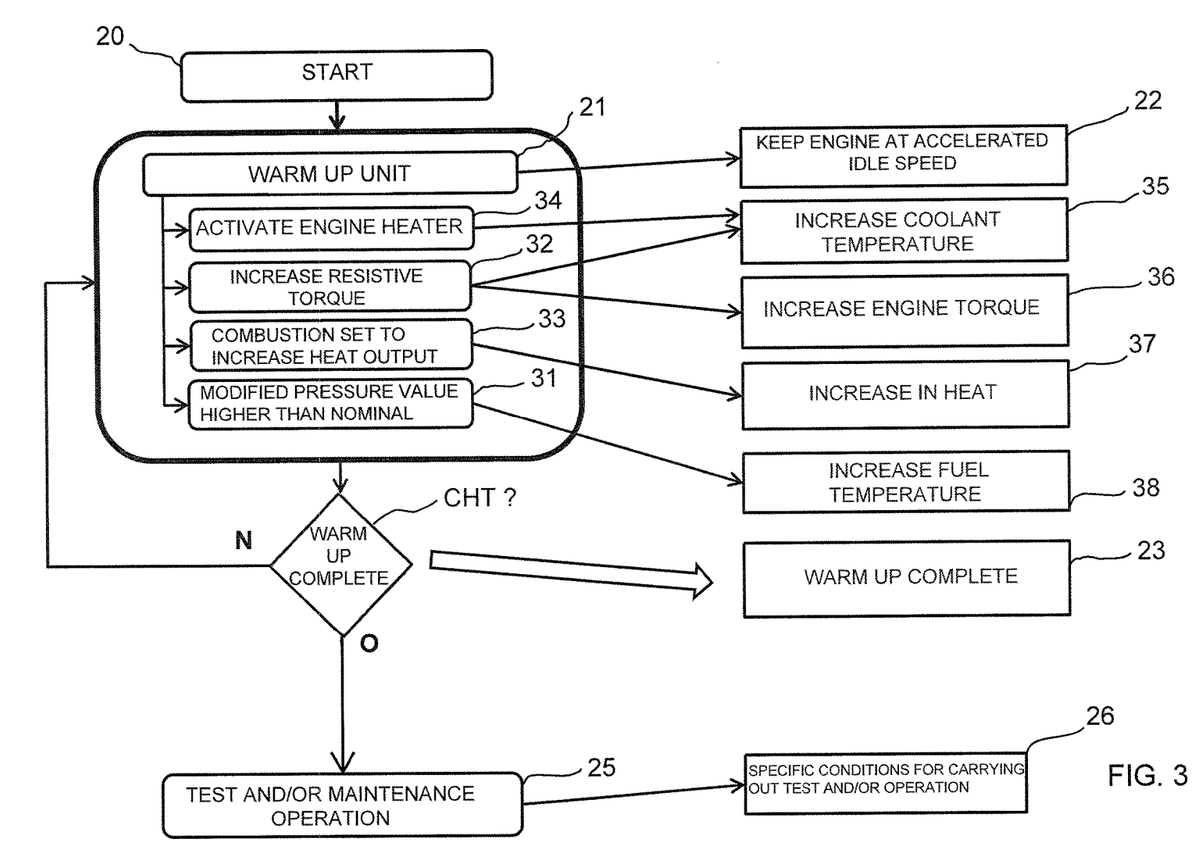
FIG. 3 is a flow diagram showing the steps of a method for the accelerated warming-up of a power unit according to one nonlimiting embodiment of an aspect of the present invention.

With reference to the flow diagram of FIG. 3 and to FIG. 2 in the case of the elements of the fuel injection system in an internal combustion engine, the present invention relates to a method for accelerating the warming-up of a power unit of a motor vehicle comprising an internal combustion engine, this method being referenced 20 in this figure.

The power unit is going to undergo a test and/or a maintenance operation during which the vehicle remains stationary with its engine running. In order to begin this test and/or this operation, the power unit needs to achieve a minimum operating temperature prior to the test and/or to the operation, and to do so as quickly as possible. This is the objective of the accelerated warm-up method that an aspect of the invention proposes.

Conventionally, the power unit comprises a fuel injection system for injecting fuel into the engine, with a high-pressure pump 3 supplying pressurized fuel to one or more injectors 1 that inject the fuel into the engine. The pressurizing of the fuel by the pump 3 is controlled according to a combustion configuration that requires a nominal pressure value dependent on engine operating parameters including engine speed and torque, this configuration being referred to as nominal.

Like in the method of the prior art, the accelerated warm-up method according to the present invention comprises a step 21 of warming up the unit, by keeping the engine at a greatly accelerated idling speed 22.

By contrast, the method according to an aspect of the invention differs in that the step 22 of maintaining the greatly accelerated idling speed is performed at a modified pressure value higher than the nominal pressure value required, this step being referenced 31 in FIG. 3.

In parallel with this step 31 of pressurizing to a value higher than the nominal pressure value, there may be other steps running at the same time. These steps, referenced 32 to 34, will be detailed later on.

During this period of operation at high fuel pressure, the temperature of the fuel in the injectors 1 and, advantageously, in the common rail 2 is progressively warmed up by the hydraulic friction imposed by the high-pressure pump 3 but especially by the increase in pressure. While the fuel is being compressed more than is necessary, there is a release of heat caused by this compression.

As an idea of the figures involved, the modified pressure value may be comprised between 1.25 and two times the nominal pressure required. The greatly accelerated idling speed may be in the region of an engine speed of 2000 to 3000 revolutions per minute. An engine speed of around 2500 revolutions per minute may correspond, for a low engine torque, to a nominal pressure of 600 to 700 bar created by the pump. Nonlimitingly, the modified pressure value according to the present invention may reach 1200 to 1400 bar.

The reference 38 indicates that an upwardly modified pressure increases the temperature of the fuel. It also increases the temperature of the injectors 1 and of all the pipes 4, 7, 8 and 9 of the injection system.

In one preferred embodiment of the present invention, in parallel with maintaining the greatly accelerated idling speed and with increasing the modified pressure value to above the nominal pressure value required, three other groups of settings may be performed, which may be implemented individually or in combination, while being associated with the greatly accelerated idling speed and the higher modified pressure value. These three groups referenced 32 to 34 are shown in FIG. 3.

The first group of settings relates to combustion settings for increasing the heat output of the engine, this group being referenced 33 in FIG. 3. These settings are grouped together under the heading of combustion settings for increasing the heat output, hereinafter referred to as CTI which stands for "Combustion for Thermal Increase". These CTI settings group together several settings relating in particular to injection parameters.

The combustion settings for increasing the heat output of the engine are carried out starting from nominal combustion that limits the production of carbon dioxide and moving toward combustion settings that increase the operating temperature in the power unit. The reference 37 symbolizes the increase in heat obtained by these combustion settings in the engine or the exhaust line.

The combustion settings for increasing heat relate to the following settings considered individually or in combination: upward adjustment of an admission of fresh air into the engine, upward adjustment of a fuel injection angle for the injection of fuel into the engine, upward adjustment of the quantity of fuel injected, adjustment of the timing of injection that takes place when each engine piston, mounted with the ability to slide in a cylinder, returns from its most inward position referred to as Top Dead Center in the cylinder after combustion in the engine.

For example, a wider injection angle at an injector outlet may cause the outermost jets to impinge on the wall of the cylinder in which a piston slides rather than on the bowl formed in the crown of the piston as they would usually.

For nominal combustion, provision is made for reducing the length of time for which the injectors are operated when the injection pressure increases. This can be maintained in the present method for which the fuel pressure is increased in order therefore to reduce or, at the very least, not increase the quantity of fuel injected.

Conversely, it is possible to inject more fuel, particularly when the plan is to carry out regeneration of at least one emissions-control element that is gradually becoming full of a selective pollutant.

In one advantageous embodiment of the present invention, when the power unit comprises an exhaust gas recirculation system recirculating gas at a regulated flow rate to an engine air intake, a combustion setting may involve interrupting or downwardly altering the flow rate of the gases recirculated to the engine air intake.

Likewise, regeneration of at least one emissions-control element situated in an exhaust line of the engine by increasing the temperature of the exhaust gases above a minimum temperature threshold may also be considered to be a combustion setting even though its main purpose is other than that of increasing heat, being namely that of regenerating an emissions-control element by burning off the selective pollutants it contains.

The second group of settings involves activating an engine heater and is referenced 34 in FIG. 3. This engine heater has an action on the increase in temperature of the coolant of the engine cooling circuit, and this is symbolized by the reference 35 by the increase in resistive torque caused by the energy consumption of the heater.

Finally, the third group of auxiliary settings relates to an increase in the resistive torque resisting the engine and is referenced 32 in FIG. 3. This may be achieved by switching on the vehicle interior air conditioning and electric deicing means or, in general, any apparatus that consumes electricity, although the heating devices are nevertheless the heaviest consumers, and therefore the best for increasing the torque.

These settings influence the increase in engine torque, which is symbolized by 35 and 36, and influence the heating-up of the engine coolant, which is symbolized by 35.

As far as the regeneration of an emissions-control element is concerned, there is a twofold problem involved in instigating regeneration. On the one hand, regeneration of at least one emissions-control element may be instigated as a preventive measure in order to avoid the need to carry out regeneration of the emissions-control element arising during the forthcoming test and/or maintenance operation. Such may be the case when there are strong reasons to suspect that the emissions-control element will become full during this test and/or this operation, which may falsify the test and/or the operation or cause it to be stopped.

This may be verified by a future estimate of the pollutant charge in said at least one emissions-control element which predicts that the maximum charge threshold of said at least one emissions-control element will be exceeded during the forthcoming test and/or operation. In that case, a preventive regeneration of the emissions-control element is therefore carried out in order to avoid disruption to the test and/or the operation.

The pollutant charge across the emissions-control element may for example be estimated according to the pressure difference across this element. In general, such an emissions-control element is a particulate filter, although this is nonlimiting.

On the other hand, regeneration of at least one emissions-control element may also be instigated in order to obtain an additional increase in heat in the engine and the exhaust line. The purpose of an unnecessary regeneration such as this is then solely to provide a further increase in heat in addition to the main heating that the present invention plans to afford by increasing the fuel pressure created by the pump.

Even if the particulate filter is not completely full, the regeneration combustion mode generates more heat.

One possible condition is that a predetermined minimum temperature in the exhaust line near said at least one emissions-control element is reached, given that regeneration cannot be instigated if the temperature is too low.

Another possible condition required is that the programmed regeneration duration must not exceed the remaining time it will take to complete the accelerated warming-up of the power unit before the test and/or maintenance operation. However, there is no compulsion to perform a complete regeneration before the test and/or maintenance operation.

At periodic intervals during the progress of the accelerated warming-up, the question as to whether the warming-up has reached the level required for proceeding with the test and/or with the operation is asked, and this is symbolized by "CHT ?" in FIG. 3.

If the answer is yes, symbolized by 0 in FIG. 3, then the test and/or the operation is proceeded with, and if the answer is no, symbolized by N, the accelerated warming-up method is continued, repeating step 21 and sub-steps 31 to 34, more particularly the step 31 of pressurizing to a value higher than the nominal pressure value.

The reference 25 symbolizes the test and/or the maintenance operation after the accelerated warming-up has been completed, the pre-requisite conditions for the test and/or operation having been satisfied. In the case of a test relating to an injection system, the accelerated warming-up may be considered to have been completed when the coolant temperature in the engine cooling circuit and the fuel temperature are higher than a respective value that can be calibrated.

The temperature of the coolant correlates with the temperature of the engine, and it is for that reason that this temperature can be chosen. The conditions for qualifying an accelerated warm-up as being complete are specific to the test and/or to the operation to be carried out and may be different, relating to other elements of the power unit than those already mentioned, for example the estimated temperature of the injectors, the temperature in an emissions-control element present in the engine exhaust line, etc.

The present invention also relates to a method for testing and/or performing a maintenance operation on a power unit during which the vehicle remains stationary with its engine running, the power unit needing to have achieved a minimum operating temperature prior to the test and/or to the operation, referenced 25 in FIG. 3. This minimum operating temperature is achieved by virtue of an accelerated warming-up prior to carrying out the test and/or the operation, performed in accordance with an accelerated warm-up method as described hereinabove.

The specific conditions for carrying out the test and/or the maintenance operation 25, for example a specific fuel pressure, are referenced in 26. By way of example of a maintenance operation, mention may be made of an intervention on an emissions-control element present in the engine exhaust line.

As an energy-saving measure in order to require just one warming-up in common, it is possible to combine a test and a maintenance operation, even if the test and the maintenance operation do not in theory have anything more in common than the fact that they both require prior warm-up. For example, it is possible to combine regeneration of an emissions-control element succeeding a test on the injectors of the injection system. The main condition is that any maintenance carried out before, during or after a test must not falsify or disrupt the running of the test.

Two examples of tests that can be conducted on a motor vehicle when stationary with an engine running will now be given, these tests relating to the injectors. For example, a first test may relate to adapting the minimum mass of fuel. In this test, the actual and target values for the quantities of fuel injected are monitored, these quantities being relatively small. These quantities are determined according to changes in engine speed and are re-updated during the period.

During such a test, small quantities of fuel are injected under conditions for which there should not be any injection, and compared against the fuel quantities estimated by a model according to the variation in measured engine speed. A correction is then made for each injector. This test, which is carried out mainly for a diesel fueled combustion engine, is known by the English-language abbreviation of MFMA which stands for Minimum Fuel Mass Adaptation, and by the French-language abbreviation of AMFM. During this test, the variation in speed is used to estimate a quantity of fuel injected. This approach is used to deduce an injection time for each injector.

With reference in particular to FIG. 2, an aspect of the present invention also relates to a motor vehicle power unit comprising an internal combustion engine and its auxiliaries, the engine and the auxiliaries of the power unit being controlled by an engine command and control unit. The power unit comprises a fuel injection system with a high-pressure pump 3 and a common rail 2 supplying fuel to one or more injectors 1.

According to an aspect of the invention, the engine command and control unit comprises means for controlling a greatly accelerated idling speed of the engine and means for controlling the pressure of the pump 3 to a modified pressure value higher than the nominal pressure value, so as to implement the accelerated warming-up method as described hereinabove.

While the accelerated warming-up method is being implemented, the nominal combustion settings are deactivated so as to allow a greatly accelerated idling speed and an increase in the pressure value achieved by the pump 3, this modified pressure being higher than the nominal pressure required for usual operation of the power unit.

As mentioned hereinabove, the objective of the accelerated warming-up of the motor vehicle power unit is to place it under conditions required for implementing a forthcoming test and/or maintenance operation. An aspect of the invention therefore relates to an assembly comprising equipment for carrying out tests and/or maintenance operations and a power unit, as described hereinabove.

In the usual way, at the start of the test and/or maintenance operation, the test and/or operation equipment, which is usually external to the vehicle being, for example, located at an after-sales automotive service dealership, is temporarily connected to the command and control unit of the power unit for the duration of the test and/or operation.

In order to make changes to the control of the power unit by its command and control unit and in particular in order to upwardly modify the pressure of the pump, the equipment comprises means for emitting a test request to the engine command and control unit of the power unit, the command and control unit comprising means of receiving the request.

As soon as it receives this request emitted by the equipment, the command and control unit proceeds to deactivate the settings known as nominal combustion settings and activates its means for operating a greatly accelerated idling speed and an increase in the pressure of the high-pressure pump of the injection system. The command and control unit therefore possesses means of activating the means for controlling the idling speed and the pressure as soon as the request is received.

The invention is in no way limited to the embodiments described and illustrated, which have been given solely by way of example.

The invention claimed is:

1. A method for accelerating warming-up of a power unit of a motor vehicle comprising an internal combustion engine, the power unit needing to undergo a test and/or maintenance operation during which the vehicle remains stationary with its engine running, the power unit needing to have achieved a minimum operating temperature prior to the test and/or the operation, the power unit comprising a fuel injection system injecting fuel into the engine using a high-pressure pump supplying pressurized fuel to one or more injectors that inject fuel into the engine, the pressurizing of the fuel by the pump being controlled according to a combustion configuration that requires a nominal pressure value dependent on engine operating parameters including an engine speed and torque, the method comprising:

warming up the unit by keeping the engine at a greatly accelerated idling speed, and maintaining the greatly accelerated idling speed at a modified fuel-pressure value higher than the nominal pressure value required so as to increase the temperature of the fuel, the operation of the injectors, in the injection phase, being reduced so that there is no increase in the fuel consumption of the vehicle as a result of said operation at the greatly accelerated idling speed taking place at said modified fuel-pressure value other than that caused by an increase in resistive torque of the high-pressure pump, corresponding to the increase in the fuel-pressure value which is modified in comparison with the nominal pressure required.

2. The method as claimed in claim 1, in which the modified pressure value comprises between 1.25 and two times the nominal pressure required, the greatly accelerated idling speed being in the region of an engine speed of 2000 to 3000 revolutions per minute.

3. The method as claimed in claim 2, in which, at the same time as the greatly accelerated idling speed is maintained at the modified pressure value higher than the nominal pressure value required, combustion settings for increasing the heat of the engine, activation of an engine heater, increase in resistive torque by activation of the vehicle interior air conditioning and/or of electric deicing means, and regeneration of at least one emissions-control element located in an exhaust line of the engine are implemented, individually or in combination.

4. The method as claimed in claim 1, in which, at the same time as the greatly accelerated idling speed is maintained at the modified pressure value higher than the nominal pressure value required, combustion settings for increasing the heat of the engine, activation of an engine heater, increase in resistive torque by activation of the vehicle interior air conditioning and/or of electric deicing means, and regeneration of at least one emissions-control element located in an exhaust line of the engine are implemented, individually or in combination.

5. The method as claimed in claim 4, in which the combustion settings for increasing the heat of the engine are made from a nominal operation of combustion that limits the production of carbon dioxide toward combustion settings that increase the operating temperature in the power unit, the combustion settings for increasing heat relating to the following settings considered individually or in combination: upward or downward adjustment of an admission of fresh air in the engine, upward adjustment of a fuel injection angle, upward adjustment of a quantity of fuel injected, adjustment of the timing of injection that takes place when each engine piston, mounted with the ability to slide in a cylinder, returns from its most inward position referred to as Top Dead Center in the cylinder after combustion in the engine.

6. The method as claimed in claim 5, in which regeneration of said at least one emissions-control element is commenced when a future estimate of the pollutant charge in said at least one emissions-control element indicates that the maximum charge level of said at least one emissions-control element will be exceeded during the forthcoming test and/or operation or, on the condition that said at least one emissions-control element contains within it a minimal charge of pollutant requiring regeneration, that a minimum predetermined temperature in the exhaust line in the vicinity of said at least one emissions-control element is reached and that the programmed regeneration duration does not exceed the remaining time it will take to warm up the power unit before the test and/or operation.

7. The method as claimed in claim 5, in which, when the power unit comprises an exhaust gas recirculation system recirculating gas at a regulated flow rate to an engine air intake, a combustion setting concerns altering the flow rate of the gases recirculated to the engine air intake.

8. The method as claimed in claim 7, in which regeneration of said at least one emissions-control element is commenced when a future estimate of the pollutant charge in said at least one emissions-control element indicates that the maximum charge level of said at least one emissions-control element will be exceeded during the forthcoming test and/or operation or, on the condition that said at least one emissions-control element contains within it a minimal charge of pollutant requiring regeneration, that a minimum predetermined temperature in the exhaust line in the vicinity of said at least one emissions-control element is reached and that the programmed regeneration duration does not exceed the remaining time it will take to warm up the power unit before the test and/or operation.

9. The method as claimed in claim 4, in which regeneration of said at least one emissions-control element is commenced when a future estimate of the pollutant charge in said at least one emissions-control element indicates that the maximum charge level of said at least one emissions-control element will be exceeded during the forthcoming test and/or operation or, on the condition that said at least one emissions-control element contains within it a minimal charge of pollutant requiring regeneration, that a minimum predetermined temperature in the exhaust line in the vicinity of said at least one emissions-control element is reached and that the programmed regeneration duration does not exceed the remaining time it will take to warm up the power unit before the test and/or operation.

10. A method for testing and/or performing a maintenance operation on a power unit during which the vehicle remains stationary with its engine running, the power unit needing to have achieved a minimum operating temperature prior to the test and/or to the operation, wherein accelerated warming-up prior to carrying out the test and/or the operation is performed in accordance with the method for the accelerated warming-up of a power unit as claimed in claim 1.

11. The method as claimed in claim 10, in which the test is of the type whereby an individual correction is applied to an injector or a minimum mass of fuel to be injected is adapted.

12. A motor vehicle power unit comprising:
an internal combustion engine and auxiliaries, and
an engine command and control unit,
the engine and the auxiliaries of the power unit being controlled by the engine command and control unit,
the power unit comprising a fuel injection system with a high-pressure pump and a common rail supplying fuel to one or more injectors,
wherein the engine command and control unit comprises means of controlling a greatly accelerated idling speed of the engine and means for controlling the pressure of the pump to a modified pressure value higher than the nominal pressure value, so as to implement an accelerated warming-up method as claimed in claim 1.

13. An assembly comprising equipment for carrying out tests and/or maintenance operations and a power unit as claimed in claim 12, the test and/or operation equipment being temporarily connected to the command and control unit of the power unit for the duration of the test and/or operation, in which the equipment comprises means for emitting a test request to the engine command and control unit of the power unit, the command and control unit comprising means of receiving the request and means of activating the means for controlling the idling speed of the engine and the pressure of the pump as soon as the request emitted by the equipment is received.

* * * * *